US009342896B2

(12) United States Patent
Seo et al.

(10) Patent No.: US 9,342,896 B2
(45) Date of Patent: May 17, 2016

(54) IMAGE PROCESSING APPARATUS, IMAGE APPARATUS, IMAGE PROCESSING METHOD, AND PROGRAM FOR ANALYZING AN INPUT IMAGE OF A CAMERA

(75) Inventors: Koichiro Seo, Kanagawa (JP); Shingo Nagataki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 1571 days.

(21) Appl. No.: 12/453,955

(22) Filed: May 28, 2009

(65) Prior Publication Data
US 2009/0322882 A1 Dec. 31, 2009

(30) Foreign Application Priority Data
Jun. 27, 2008 (JP) ................. 2008-169515

(51) Int. Cl.
*H04N 9/47* (2006.01)
*G06T 7/20* (2006.01)
*G08B 13/196* (2006.01)
*H04N 5/14* (2006.01)

(52) U.S. Cl.
CPC ........ *G06T 7/2006* (2013.01); *G08B 13/19606* (2013.01); *H04N 5/144* (2013.01); *G06T 2207/10016* (2013.01); *G06T 2207/20132* (2013.01); *G06T 2207/30232* (2013.01)

(58) Field of Classification Search
CPC ............................... G08B 13/19606
USPC ............ 348/46, 143, 169, 207.1, 220.1, 452, 348/586, 152, 155; 396/427, 428; 382/103, 382/107, 118, 170, 236, 308; 375/240.16
See application file for complete search history.

(56) References Cited

U.S. PATENT DOCUMENTS

| 5,956,424 A * | 9/1999 | Wootton | G08B 13/19602 340/541 |
| 6,097,429 A * | 8/2000 | Seeley | G08B 13/19602 348/154 |
| 6,130,707 A * | 10/2000 | Koller | G08B 13/19602 340/511 |
| 6,298,144 B1 * | 10/2001 | Pucker, II | G06T 7/2053 348/155 |
| 6,301,301 B1 * | 10/2001 | Isu et al. | 375/240.14 |
| 6,311,019 B1 * | 10/2001 | Ide | 396/95 |
| 6,741,725 B2 * | 5/2004 | Astle | 382/103 |
| 6,931,146 B2 * | 8/2005 | Aoki et al. | 382/107 |
| 6,947,073 B1 * | 9/2005 | Seal | G01S 3/7865 348/143 |
| 7,015,943 B2 * | 3/2006 | Chiang | G08B 13/19634 348/143 |

(Continued)

FOREIGN PATENT DOCUMENTS

JP 2003-061076 A 2/2003
JP 2003-271972 A 9/2003

(Continued)

*Primary Examiner* — Imad Hussain
(74) *Attorney, Agent, or Firm* — Hazuki International, LLC

(57) ABSTRACT

Disclosed herein is an image processing apparatus including: a detection section configured to detect a motion area in a screen based on images taken, and output detection information; an accumulation section configured to accumulate the detection information for the past as outputted from the detection section; an area division section configured to divide the screen into an area where motions regularly occur and a motion-free area, based on the detection information for the past as accumulated in the accumulation section, and output area information; and an alarm management section configured to perform particular control based on the area information from the area division section and the detection information from the detection section.

21 Claims, 16 Drawing Sheets

(56) References Cited

U.S. PATENT DOCUMENTS

| | | | |
|---|---|---|---|
| 7,088,846 B2* | 8/2006 | Han et al. .................... 382/103 |
| 7,227,893 B1* | 6/2007 | Srinivasa et al. ......... 375/240.08 |
| 7,676,087 B2* | 3/2010 | Dhua et al. .................. 382/170 |
| 7,677,816 B2* | 3/2010 | Aoki et al. ................... 396/427 |
| 7,783,118 B2* | 8/2010 | Zhou ............................ 382/236 |
| 7,864,980 B2* | 1/2011 | Evans ............... G06K 9/00771 348/154 |
| 8,027,523 B2* | 9/2011 | Sun et al. ..................... 382/118 |
| 8,041,077 B2* | 10/2011 | Bell ................... G06K 9/00771 348/155 |
| 2001/0030689 A1* | 10/2001 | Spinelli ................. H04N 7/183 348/155 |
| 2003/0025599 A1* | 2/2003 | Monroe ........... G08B 13/19602 340/531 |
| 2004/0047419 A1* | 3/2004 | Wakabayashi et al. .. 375/240.16 |
| 2005/0104727 A1* | 5/2005 | Han ................... G06K 9/00335 340/541 |
| 2005/0157169 A1* | 7/2005 | Brodsky ................ G01S 3/7864 348/143 |
| 2005/0157183 A1* | 7/2005 | Iijima ........................ 348/220.1 |
| 2005/0280707 A1* | 12/2005 | Sablak ............... H04N 5/23248 348/155 |
| 2007/0115351 A1* | 5/2007 | McCormack .... G08B 13/19606 348/36 |
| 2007/0183770 A1* | 8/2007 | Aoki ................ G08B 13/19641 396/428 |
| 2007/0236561 A1* | 10/2007 | Anai et al. ...................... 348/46 |
| 2008/0024667 A1* | 1/2008 | Ajioka .......................... 348/586 |
| 2008/0158361 A1* | 7/2008 | Itoh .................. G08B 13/19602 348/155 |
| 2008/0192986 A1* | 8/2008 | Living ......................... 382/107 |
| 2009/0009598 A1* | 1/2009 | Sotodate ....................... 348/143 |
| 2009/0167870 A1* | 7/2009 | Caleca et al. .............. 348/207.1 |
| 2010/0026808 A1* | 2/2010 | Kagehiro .............. G07F 19/207 348/152 |
| 2010/0085478 A1* | 4/2010 | Yamamoto et al. ........... 348/452 |
| 2010/0253793 A1* | 10/2010 | Auberger et al. .......... 348/208.4 |

FOREIGN PATENT DOCUMENTS

| JP | 2003-274390 | 9/2003 |
|---|---|---|
| JP | 2006-079594 | 3/2006 |

\* cited by examiner

F I G . 1
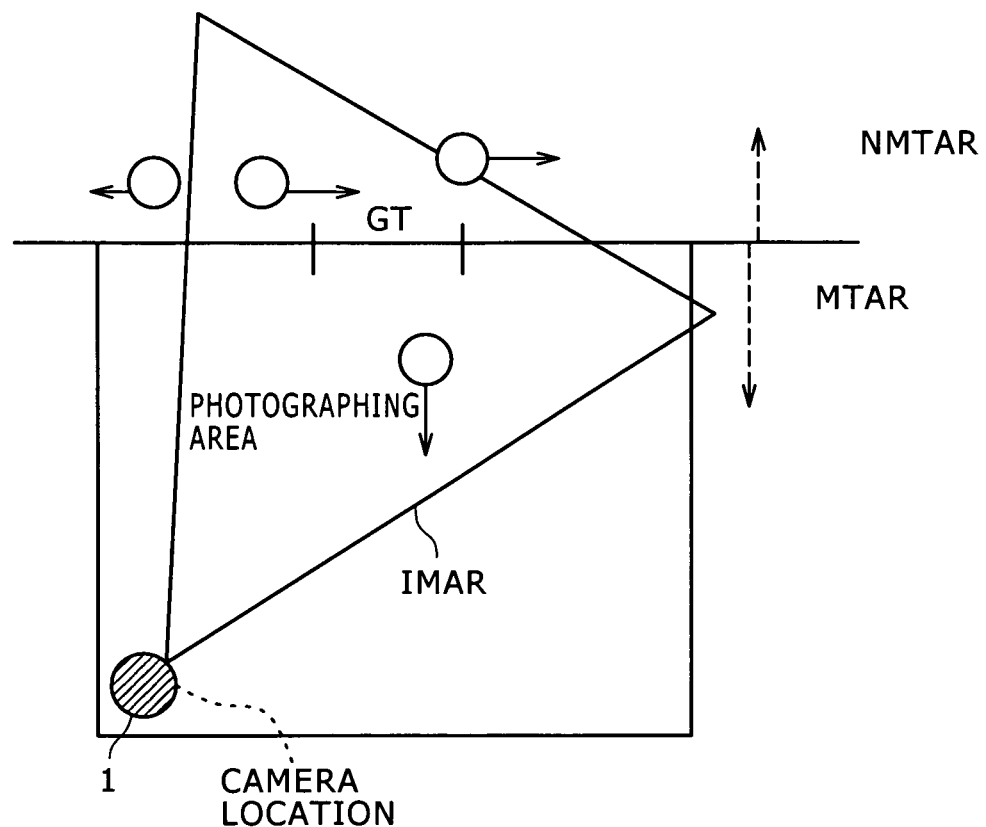
F I G . 2
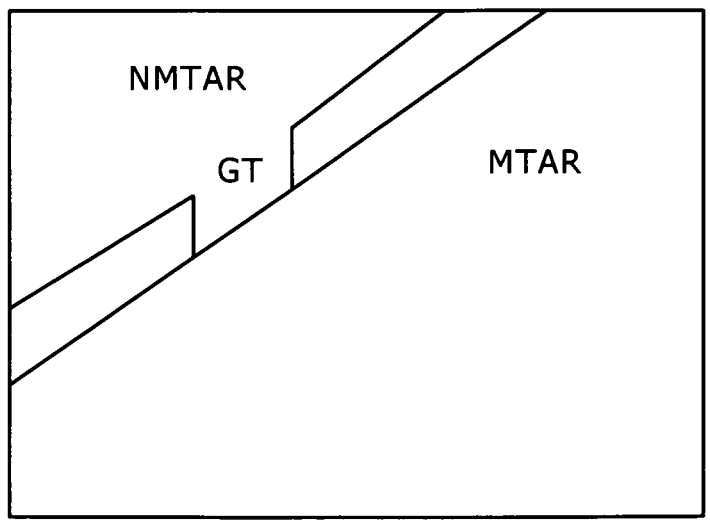

ABNORMALITY WHERE ISSUANCE OF ALARM IS DESIRABLE

SITUATION WHERE ALARM SHOULD NOT BE ISSUED TO AVOID INCREASE IN MONITORING COST

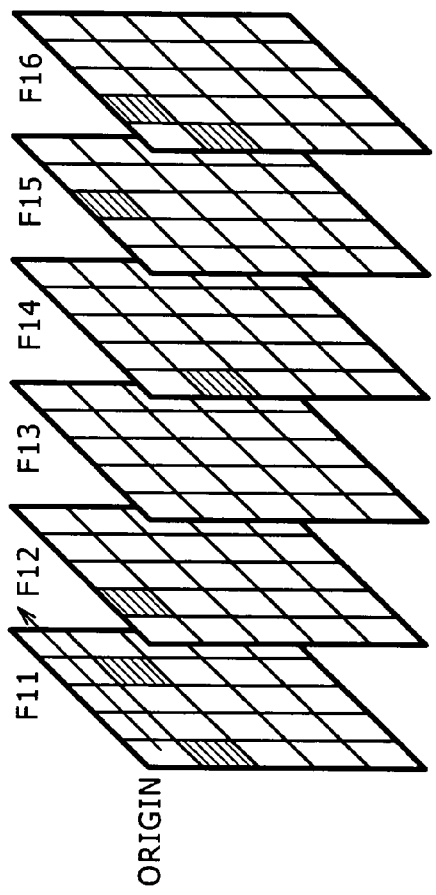

| FREQUENCY OF MOTION DETECTION AT COORDINATES (0, 0) | FREQUENCY OF MOTION DETECTION AT COORDINATES (1, 0) | FREQUENCY OF MOTION DETECTION AT COORDINATES (2, 0) | FREQUENCY OF MOTION DETECTION AT COORDINATES (3, 0) | FREQUENCY OF MOTION DETECTION AT COORDINATES (4, 0) |
|---|---|---|---|---|
| FREQUENCY OF MOTION DETECTION AT COORDINATES (0, 1) | FREQUENCY OF MOTION DETECTION AT COORDINATES (1, 1) | FREQUENCY OF MOTION DETECTION AT COORDINATES (2, 1) | FREQUENCY OF MOTION DETECTION AT COORDINATES (3, 1) | FREQUENCY OF MOTION DETECTION AT COORDINATES (4, 1) |
| FREQUENCY OF MOTION DETECTION AT COORDINATES (0, 2) | FREQUENCY OF MOTION DETECTION AT COORDINATES (1, 2) | FREQUENCY OF MOTION DETECTION AT COORDINATES (2, 2) | FREQUENCY OF MOTION DETECTION AT COORDINATES (3, 2) | FREQUENCY OF MOTION DETECTION AT COORDINATES (4, 2) |
| FREQUENCY OF MOTION DETECTION AT COORDINATES (0, 3) | FREQUENCY OF MOTION DETECTION AT COORDINATES (1, 3) | FREQUENCY OF MOTION DETECTION AT COORDINATES (2, 3) | FREQUENCY OF MOTION DETECTION AT COORDINATES (3, 3) | FREQUENCY OF MOTION DETECTION AT COORDINATES (4, 3) |
| FREQUENCY OF MOTION DETECTION AT COORDINATES (0, 4) | FREQUENCY OF MOTION DETECTION AT COORDINATES (1, 4) | FREQUENCY OF MOTION DETECTION AT COORDINATES (2, 4) | FREQUENCY OF MOTION DETECTION AT COORDINATES (3, 4) | FREQUENCY OF MOTION DETECTION AT COORDINATES (4, 4) |

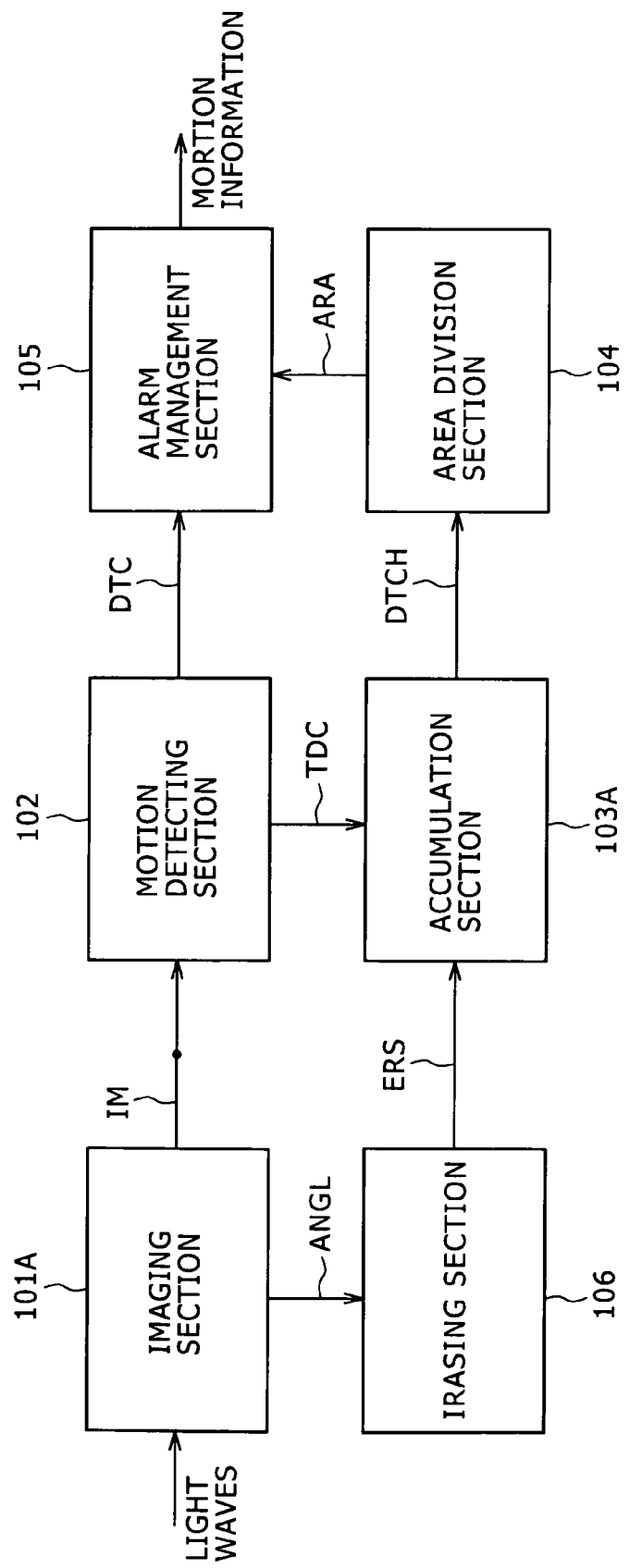

IMAGE PROCESSING APPARATUS, IMAGE APPARATUS, IMAGE PROCESSING METHOD, AND PROGRAM FOR ANALYZING AN INPUT IMAGE OF A CAMERA

BACKGROUND OF THE INVENTION

1. Field of the Invention

The present invention relates to an image processing apparatus, an imaging apparatus, an image processing method, and a program which are applicable to a surveillance camera or the like.

2. Description of the Related Art

A technique is known for analyzing an input image of a camera to precisely detect a motion that has occurred in a screen (see Japanese Patent Laid-open No. 2006-79594, hereinafter referred to as Patent Document 1 for example).

According to the technique disclosed in Patent Document 1, with respect to each macroblock, images that are N frames apart from each other are compared with each other to calculate motion vectors, and with respect to each motion vector, temporal uniformity is determined to determine whether or not that motion vector belongs to a moving object. This achieves an increase in precision of motion detection information.

Also, a technique has been proposed for, for example, reducing a load on a monitoring system by use of detected motion information, as described below.

For example, a technique is known of alerting a surveillant in order to reduce a load on the surveillant.

Also, a technique has been proposed of decreasing a resolution of images to be transmitted when there is no motion, in other words, when there is no need for monitoring, in order to reduce a load on a network (see Japanese Patent Laid-open No. 2003-274390, hereinafter referred to as Patent Document 2 for example).

Also, a technique is known of omitting to record the images when there is no motion, in other words, when there is no need for monitoring, in order to reduce recording resources.

As described above, a variety of techniques have been proposed in recent years, and some of these techniques have already been put into practical use, such as in a field of surveillance cameras, for example.

Patent Document 2 has proposed a video distribution server and a video receiving client system which allow acquisition of video with a desired quality.

This system is configured to detect an unexpected occurrence in an area related to an object of photographing by an imaging apparatus, and control a compression ratio to allow an efficient use of a band of a transmission channel and acquisition of video with a desired quality while reducing a load on a user.

These techniques share the presupposition that absence of a motion in an area photographed by the surveillance camera is expectable during the photographing. On this presupposition, occurrence of even a few motions may be determined to be an abnormality.

For example, the aforementioned techniques and system will be effective for the purpose of monitoring areas where no motions are normally expected to occur, such as an inside of a vault without a human guard or a private land.

SUMMARY OF THE INVENTION

However, not all areas that are photographed by the surveillance camera are areas where no motions are normally expected to occur during the photographing.

In some situations, a surveillance camera 1 need be installed so as to include an area where motions regularly occur in a photographing area, as illustrated in FIG. 1. In FIG. 1, "IMAR" represents the photographing area, "MTAR" represents a monitoring target area, "NMTAR" represents a non-monitoring target area, and "GT" represents an entrance gate.

It is difficult to apply the aforementioned system to cases such as the case of FIG. 1.

FIG. 2 illustrates an image obtained by photographing from an angle of FIG. 1.

FIG. 3 illustrates an example of abnormality (occurrence of a motion) where it is desirable to issue an alarm.

FIG. 4 illustrates a situation where it is not desirable to issue an alarm.

The known techniques will handle a scene as illustrated in the image of FIG. 2 taken from the angle of FIG. 1 in the following manner.

That is, although the issuance of an alarm is desirable only in case of an abnormality (occurrence of a motion) in the monitoring target area MTAR as illustrated in FIG. 3, the known techniques will react to even occurrence of a motion in the non-monitoring target area NMTAR as illustrated in FIG. 4.

In related art, the following measures are taken against the above problem:
A) An alarm is issued using another device than the camera, such as an infrared sensor; and
B) As illustrated in FIG. 5, an area that should be excluded from a detection target is specified beforehand, and a detection process is not performed with respect to the specified area.

The above measure A) involves a problem of an additional cost of installing the device other than the surveillance camera. The above measure B) involves a problem of an additional load on a user, and as illustrated in FIG. 6, the surveillance camera 1 today does not necessarily have a fixed angle.

In this case, a method of specifying a mask area each time a change occurs in the angle would impair usefulness of the known techniques in terms of reducing the load on the user.

Embodiments of the present invention address the above-identified, and other problems associated with existing methods and apparatuses, and provides an image processing apparatus, an imaging apparatus, an image processing method, and a program which achieve a reduction in the load on the surveillant, a retrenchment in the recording resources, a reduction in the load on the network, or the like.

According to an embodiment of the present invention, there is provided an image processing apparatus including: a detection section configured to detect a motion area in a screen based on images taken, and output detection information; an accumulation section configured to accumulate the detection information for the past as outputted from the detection section; an area division section configured to divide the screen into an area where motions regularly occur and a motion-free area, based on the detection information for the past as accumulated in the accumulation section, and output area information; and an alarm management section configured to perform particular control based on the area information from the area division section and the detection information from the detection section.

According to another embodiment of the present invention, there is provided an imaging apparatus including: an imaging section configured to at least take images based on control from an outside; a detection section configured to detect a motion area in a screen based on the images taken by the imaging section, and output detection information; an accumulation section configured to accumulate the detection information for the past as outputted from the detection section; an area division section configured to divide the screen into an area where motions regularly occur and a motion-free area, based on the detection information for the past as accumulated in the accumulation section, and output area information; and an alarm management section configured to perform particular control based on the area information from the area division section and the detection information from the detection section.

According to yet another embodiment of the present invention, there is provided an image processing method including the steps of: detecting a motion area in a screen based on images taken to obtain detection information; accumulating the detection information for the past as obtained in the detecting; dividing the screen into an area where motions regularly occur and a motion-free area, based on the detection information for the past as accumulated in the accumulating, to obtain area information; and performing particular control based on the area information obtained in the dividing and the detection information obtained in the detecting.

According to yet another embodiment of the present invention, there is provided a program for causing a computer to perform image processing including the processes of: detecting a motion area in a screen based on images taken to obtain detection information; accumulating the detection information for the past as obtained in the detecting; dividing the screen into an area where motions regularly occur and a motion-free area, based on the detection information for the past as accumulated in the accumulating, to obtain area information; and performing particular control based on the area information obtained in the dividing and the detection information obtained in the detecting.

According to embodiments of the present invention, in the detection section, the motion area in the screen is detected based on the images taken, and the detection information is outputted to the accumulation section and the alarm management section.

The detection information for the past as outputted from the detection section is accumulated in the accumulation section. In the area division section, the screen is divided into the area where motions regularly occur and the motion-free area based on the detection information for the past as accumulated in the accumulation section, and the area information is outputted to the alarm management section.

Then, in the alarm management section, the particular control is performed based on the area information from the area division section and the detection information from the detection section.

According to the embodiments of the present invention, a reduction in the load on the surveillant, a retrenchment in the recording resources, a reduction in a network load, and so on are achieved.

BRIEF DESCRIPTION OF THE DRAWINGS

FIG. 1 illustrates an exemplary situation where a surveillance camera is installed so as to include an area where motions regularly occur in a photographing area;

FIG. 2 illustrates an image taken from an angle of FIG. 1;

FIGS. 12A and 12B illustrate another exemplary situation of the motion detection and another exemplary format of the detection information history according to the present embodiment;

FIG. 14 is a block diagram illustrating an exemplary structure of an imaging apparatus (a camera apparatus) to which an image processing apparatus according to a second embodiment of the present invention is applied;

FIGS. 16A-1, 16A-2, 16B-1, 16B-2, and 16C illustrate exemplary conceptual illustrations of images taken of a scene as illustrated in FIG. 15 and exemplary detection information histories;

DETAILED DESCRIPTION OF THE PREFERRED EMBODIMENTS

Hereinafter, preferred embodiments of the present invention will be described with reference to the accompanying drawings.

In the description of the preferred embodiments, there will be described imaging apparatuses (camera apparatuses) having an image processing apparatus configured to analyze video data obtained from a surveillance camera or the like that performs fixed point photographing or quasi-fixed point photographing to provide a precise motion detection result.

In the description of the preferred embodiments, a background and outline of the present invention will be described first, and then descriptions of specific exemplary structures will be provided.

Surveillance cameras or the like perform the fixed point photographing or the quasi-fixed point photographing where a preset angle is changed manually or automatically, and they often continue the photographing for 24 hours a day and 365 days a year.

Monitoring of all information will result in an increased load on a surveillant.

Recording of all the information will require enormous recording resources.

Because of this background, surveillance camera systems involve a demand to detect only occurrence of abnormalities precisely.

As such, monitoring may be carried out only when abnormality information has been issued by a device, whereby a reduction in the load on the surveillant can be achieved.

In the case where the monitoring is carried out only when the abnormality information has been issued by the device, a retrenchment in physical resources such as a hard disc drive or a videotape can be achieved.

A common technique is to define a time of abnormality as "a time when a difference has occurred in brightness (or a color signal) in a screen" and perform detection and an alarm issuing process.

However, an area photographed by the surveillance camera is not necessarily an area where absence of a motion is expectable during the photographing.

Figures 1, 16A:
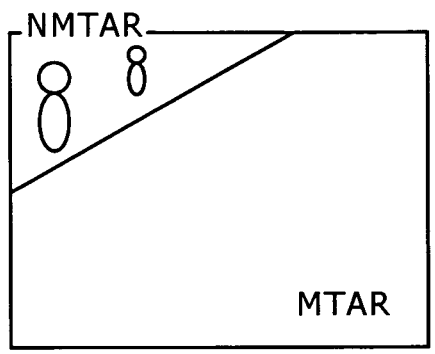

In some situations, the surveillance camera need be installed so as to include an area where motions regularly occur in a photographing area, as illustrated in FIG. 1. The above demand cannot be satisfied if all of the regularly occurring motions are detected as abnormalities.

In related art, the following measures are taken against the above problem:
A) An alarm is issued using another device than the camera, such as an infrared sensor; and
B) An area that should be excluded from a detection target is specified beforehand, and the detection process is not performed with respect to the specified area.

The above measures A) and B) have the following problems:
A) An additional cost of installing the device other than the surveillance camera;
B-1) An additional load on the surveillant; and
B-2) The surveillance camera does not necessarily perform the fixed point photographing.

When the surveillance camera performs the quasi-fixed point photographing, the load increases.

In addition, in the case of arbitrary point observation, matching of the specified area and a mask area is difficult to achieve.

As such, in the preferred embodiments of the present invention, based on motion information accumulated in an accumulation section for accumulating the motion information, an area division section divides a whole area into an "area where motions regularly occur" and a "motion-free area", and an alarm management section automatically cancels motions as appropriate. This contributes to improving precision of the motion information in the surveillance camera system.

In addition, in the preferred embodiments, a problem related to the above B-2) is solved by switching a map to be updated in conjunction with angle information.

This function may be either implemented by another device than the camera or may be incorporated in the camera.

Next, specific embodiments of the present invention will be described below.

First Embodiment

First, a first embodiment of the present invention will be described below with reference to the accompanying drawings. Note that the first embodiment assumes that the fixed point photographing, i.e., photographing constantly from a fixed angle, is performed.

Figure 3:
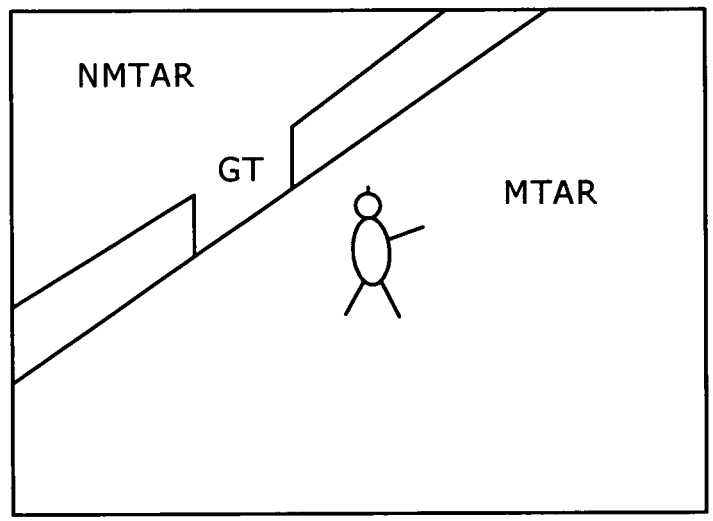
FIG. 3 illustrates an example of abnormality (occurrence of a motion) where it is desirable to issue an alarm.
Figure 4:
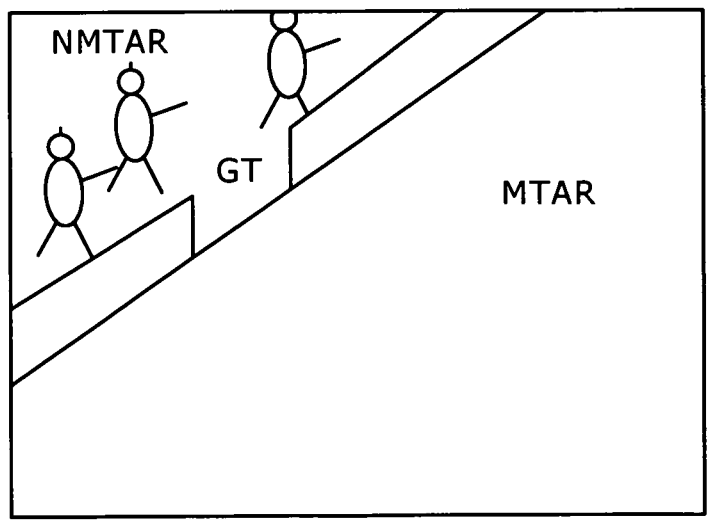
FIG. 4 illustrates a situation where it is not desirable to issue an alarm.
Figure 5:
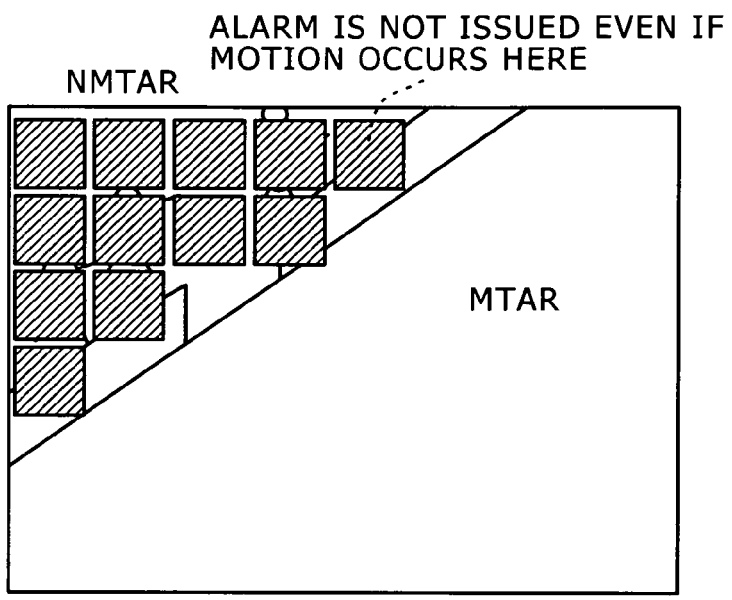
FIG. 5 is a diagram for explaining a case where an area that should be excluded from a detection target is specified beforehand, and a detection process is not performed with respect to the specified area.
Figure 6:
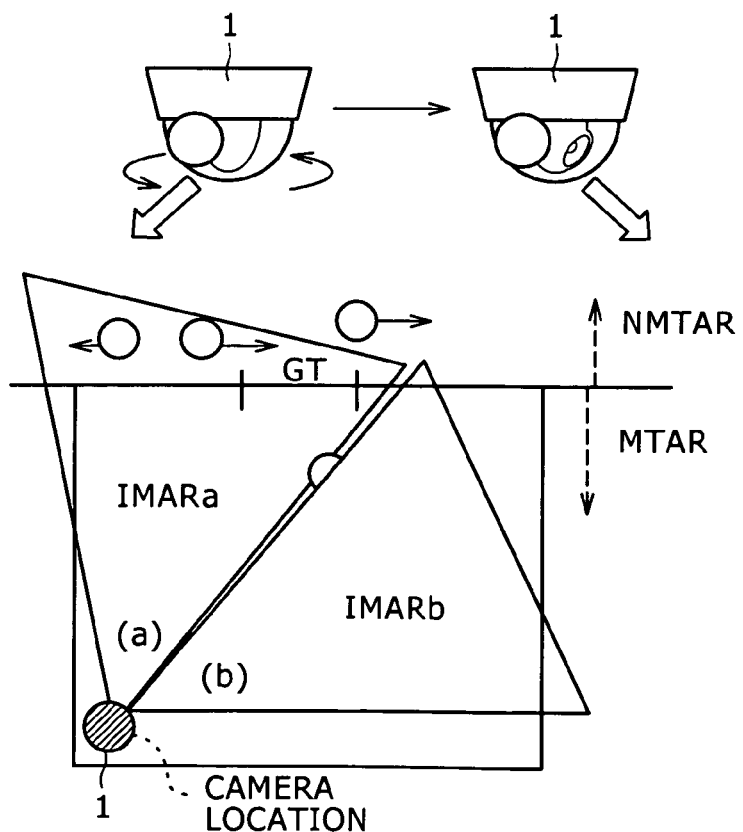
FIG. 6 is a diagram for explaining that the surveillance camera does not always have a fixed angle.
Figure 7:
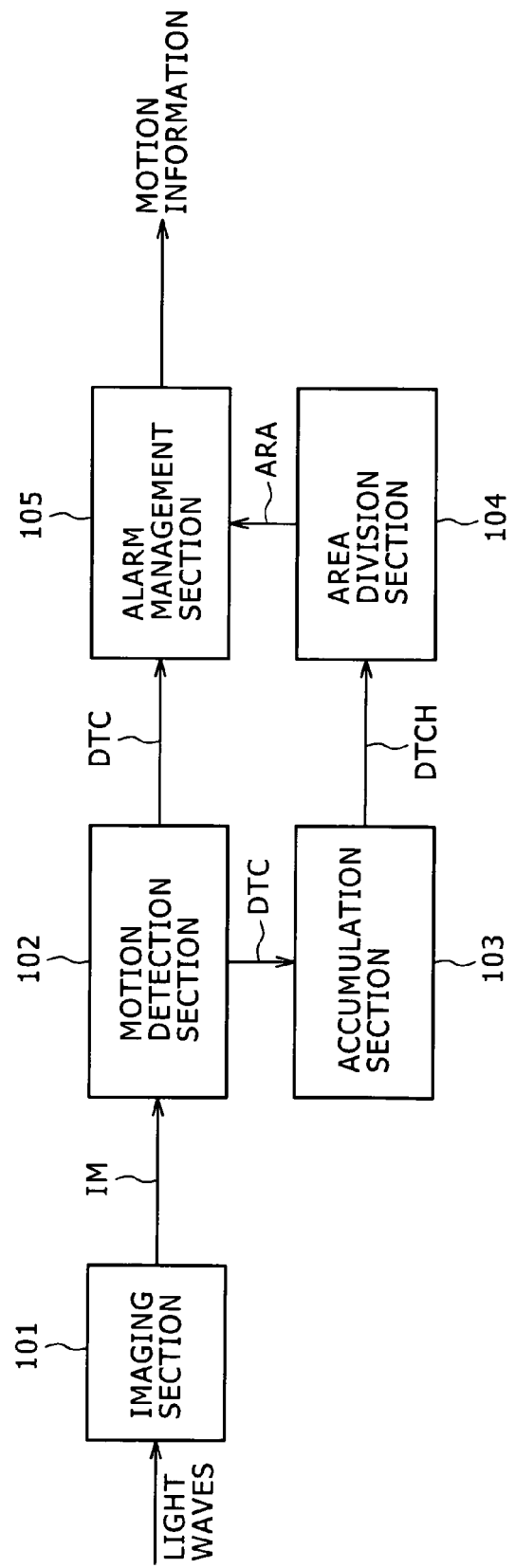
FIG. 7 is a block diagram illustrating an exemplary structure of an imaging apparatus (a camera apparatus) to which an image processing apparatus according to a first embodiment of the present invention is applied.

FIG. 7 is a block diagram illustrating an exemplary structure of an imaging apparatus (a camera apparatus) 100 to which an image processing apparatus according to the first embodiment of the present invention is applied.

As illustrated in FIG. 7, the imaging apparatus 100 includes an imaging section 101, a motion detection section 102, an accumulation section 103, an area division section 104, and an alarm management section 105.

Of all these components, the motion detection section 102, the accumulation section 103, the area division section 104, and the alarm management section 105 combine to form the image processing apparatus.

The imaging section 101 accepts light waves formed of light reflected from a subject and so on, converts the light waves into an image, and outputs the image to the motion detection section 102 in the subsequent stage.

Figure 8:
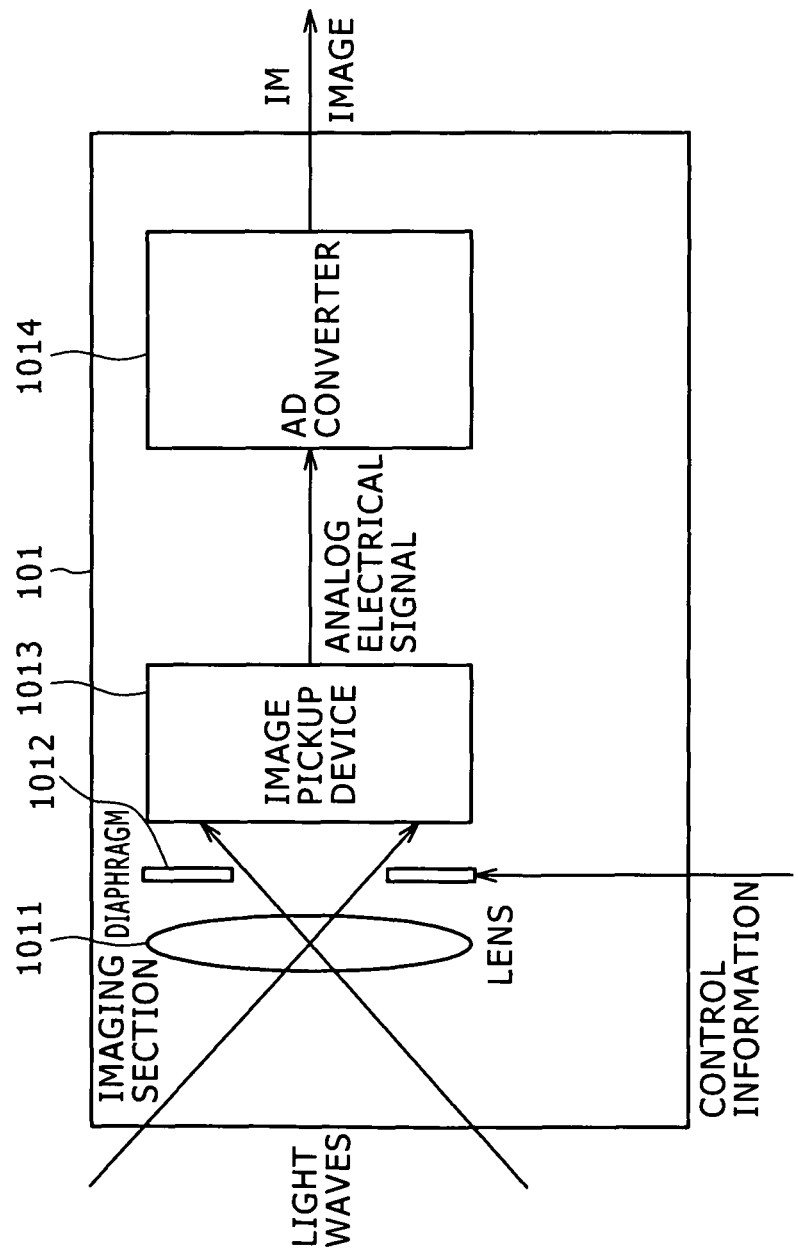
FIG. 8 is a block diagram illustrating an exemplary structure of an imaging section according to the present embodiment.

FIG. 8 is a block diagram illustrating an exemplary detailed structure of the imaging section 101 according to the present embodiment.

The imaging section 101 includes at least a lens 1011, a diaphragm 1012, an image pickup device 1013, formed by a CCD (Charge Coupled Device) or CMOS (Complementary Metal Oxide Semiconductor) sensor, and an analog to digital (AD) converter 1014.

In the imaging section 101, the light waves accepted pass through the lens 1011 to form an image of the subject on the image pickup device 1013. The image pickup device 1013 converts the light from the subject into an analog electrical signal, and the AD converter 1014 converts the analog electrical signal into a digital signal so as to finally output it as digital image data (IM).

The imaging section 101 may further contain, as necessary, the diaphragm 1012, an electronic or mechanical shutter, a variable-gain amplifier, and so on. Then, the imaging section 101 is capable of properly adjusting an exposure value of the output image by varying an aperture of the diaphragm 1012, a time when the shutter is open, a gain value, and so on based on control information from an outside.

Of those components, only the diaphragm 1012 is provided in the imaging section 101 as illustrated in FIG. 8, for the sake of simplicity. The amount of light impinging on the image pickup device 1013 and hence the exposure value can be adjusted by increasing or decreasing the aperture of the diaphragm 1012 based on the control information from the outside.

The motion detection section 102 receives the image, detects a moving object in the input image using an arbitrary technique, and outputs a result of the motion detection as detection information DTC.

The motion detection section 102 can adopt a variety of methods to detect the moving object. For example, the motion detection section 102 may adopt a method as disclosed in Patent Document 1 or the like.

In this case, the motion detection section 102 calculates motion vectors based on input images, and thereafter integrates the motion vectors individually in terms of time, and calculates an integrated value and the number of integrations for each motion vector. The motion detection section 102 calculates temporal uniformity individually with respect to each motion vector. Then, the motion detection section 102 determines, with respect to each motion vector, whether or not that motion vector belongs to any moving object, based on the integrated value and the number of integrations for the motion vector and the temporal uniformity.

Note that the detection result (i.e., the detection information) specifically refers to a location and magnitude of a motion that has occurred in the screen. This may be represented by a binary signal that indicates presence or absence of a motion for each macroblock (MB). While a low detection rate is allowable, it is desirable that the rate of erroneous detection and the rate of failed issuance of the alarm should be low.

The accumulation section 103 receives the detection result from the motion detection section 102, converts it into a predetermined format to accumulate it therein.

Note that the detection information accumulated in the accumulation section 103 will be hereinafter referred to as a "detection information history."

The area division section 104 receives the detection information history DTCH from the accumulation section 103, divides the screen into the "area where motions regularly occur" and the "motion-free area" based on the detection information history DTCH, and outputs this information to the alarm management section 105 as area information ARA.

The alarm management section 105 receives the detection result DTC and the area information ARA from the motion detection section 102 and the area division section 104, respectively, and outputs final motion information based on the detection result DTC and the area information ARA.

The alarm management section 105 determines whether or not the detection result should be masked (cancelled) with respect to each macroblock based on the area information ARA, and completes this process when the determination has been made with respect to all macroblocks.

Figure 9:
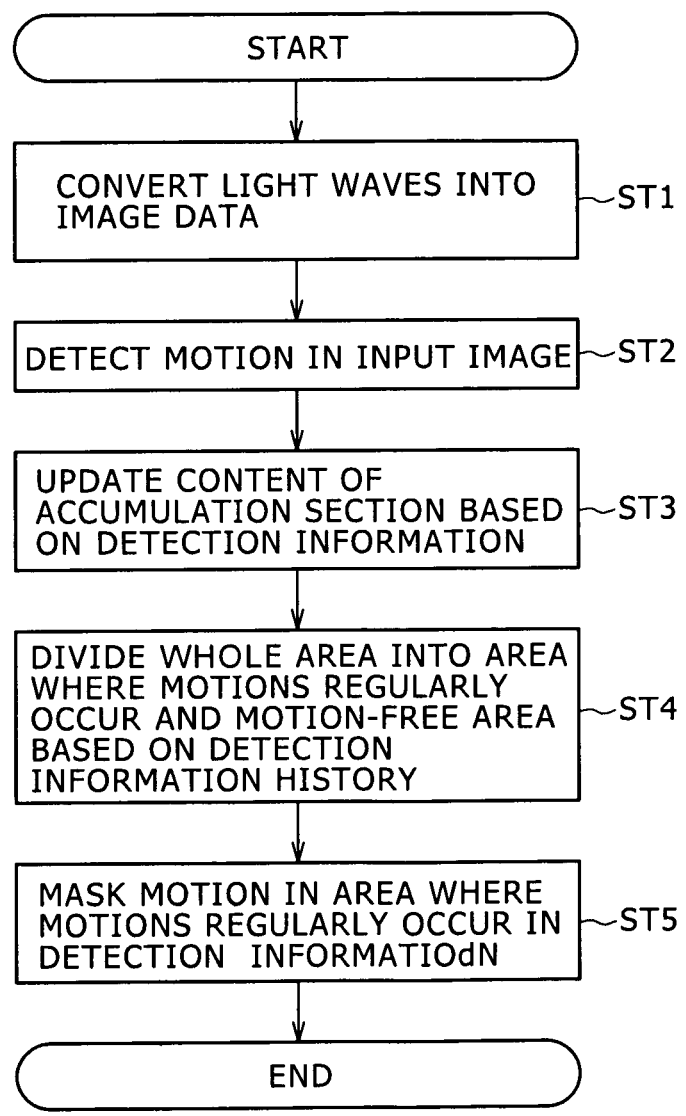
FIG. 9 is a flowchart illustrating an exemplary operation flow from reception of light waves to output of final motion detection information by an alarm management section.

FIG. 9 is a flowchart illustrating an exemplary operation flow from t the output of the final motion detection information by the alarm management section 105.

After start of this procedure, at step ST1, the imaging section 101 converts the received light waves into the image data, and outputs the image data to the motion detection section 102.

Next, at step ST2, the motion detection section 102 detects a motion area in the image data, and outputs the detection result to the accumulation section 103 and the alarm management section 105 as the detection information DTC.

At step ST3, the accumulation section 103 updates the detection information history DTCH based on the detection information DTC, and outputs the resulting detection information history DTCH to the area division section 104.

Next, at step ST4, the area division section 104 analyzes the detection information history DTCH, divides the whole area into the area where motions regularly occur and the motion-free area, and outputs the result to the alarm management section 105 as the area information ARA.

Lastly, at step ST5, the alarm management section 105 masks any motion in the area where motions regularly occur in the detection information DTC outputted from the motion detection section 102, and outputs the final motion information.

Figure 10:
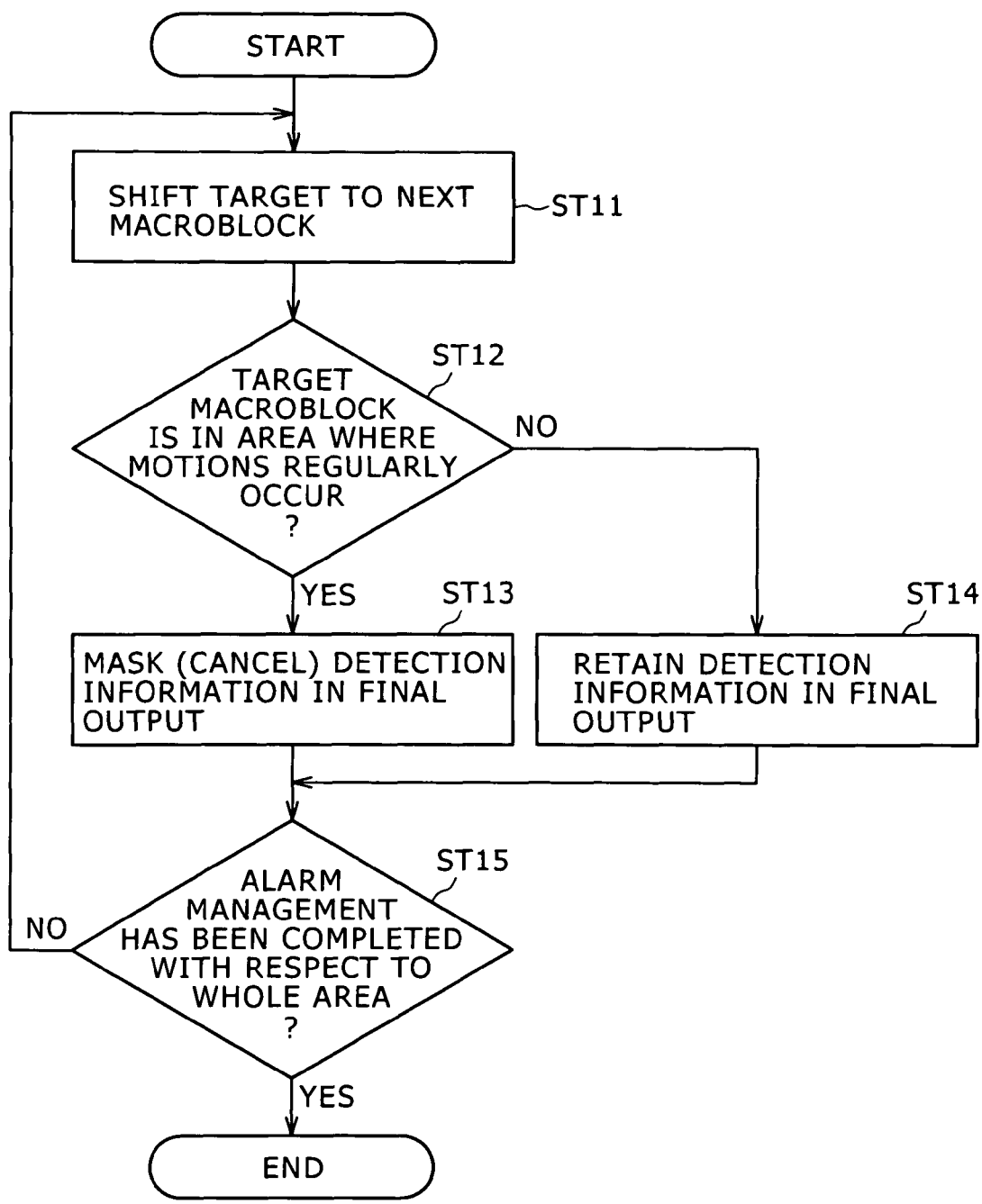
FIG. 10 is a flowchart illustrating an exemplary operation flow up to an eventual output of the alarm based on a detection result and area information.

FIG. 10 is a flowchart illustrating an exemplary operation flow up to an eventual output of the alarm based on the detection result and the area information.

First, at step ST1, the alarm management section 105 shifts a target to a next block, and determines at step ST12 whether or not the target block is in the area where motions regularly occur.

If it is determined at step ST12 that the target block is in the area where motions regularly occur, the alarm management section 105 masks (cancels) the detection information in a final output.

If it is determined at step ST12 that the target block is not in the area where motions regularly occur, the alarm management section 105 retains the detection information in the final output.

Then, at step ST15, the alarm management section 105 determines whether or not the determination has been completed with respect to all macroblocks (i.e., the whole area), and if it is determined that the determination has been completed with respect to all the macroblocks, this procedure is completed.

If it is determined at step ST15 that the determination has not been completed for the whole area, control returns to step ST11, and the above-described processes are repeated.

Figure 11A:
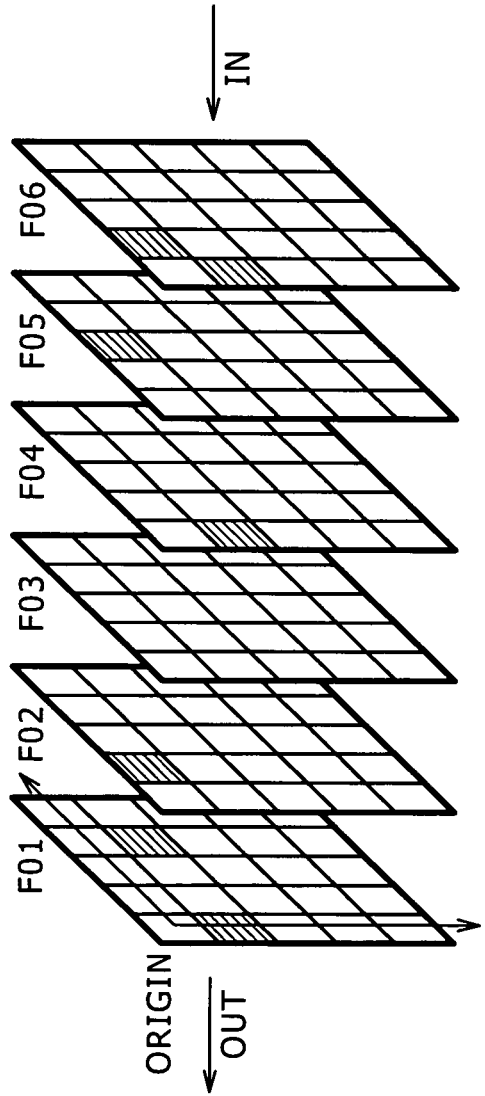
FIGS. 11A and 11B illustrate an exemplary situation of motion detection and an exemplary format of a detection information history according to the present embodiment.
Figure 11B:
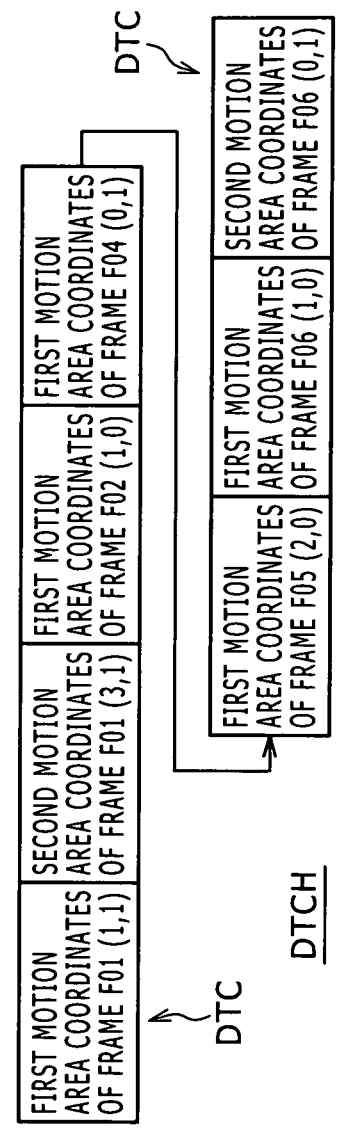
Figure 13A:
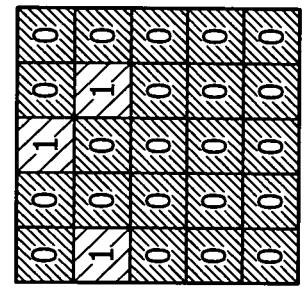
FIGS. 13A, 13B, 13C, 13D, 13E, and 13F illustrate how the detection information history in the format as illustrated in FIG. 12B is updated sequentially in an accumulation section, based on detection results for six images as illustrated in FIG. 12A.
Figure 13B:
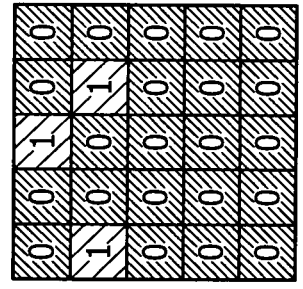
Figure 13C:
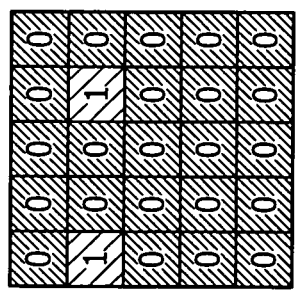
Figure 13D:
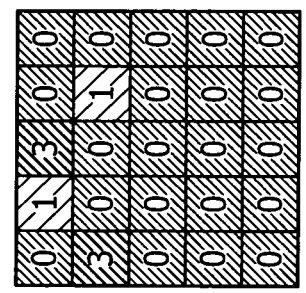
Figure 13E:
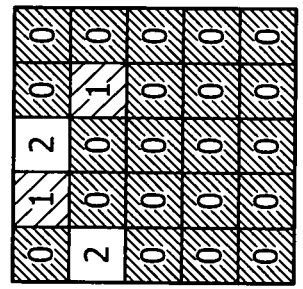
Figure 13F:
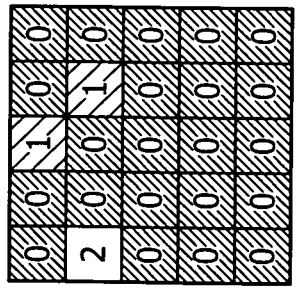

FIGS. 11A and 11B illustrate an exemplary situation of motion detection and an exemplary format of the detection information history according to the present embodiment.

FIG. 11A illustrates an exemplary situation of motion detection in a series of images.

In FIG. 11A, images F01 to F06 are each divided into 5×5 areas, and each area where a motion has been detected is hatched, while the other areas are not hatched.

FIG. 11B illustrates an exemplary format of the detection information history in the accumulation section 103.

Here, FIG. 11B illustrates an accumulation of detection results about the six images illustrated in FIG. 11A.

In FIG. 11B, each entry is composed of a set of information identifying an image where a motion has been detected and coordinates of a motion area in that image, and the pieces of detection information regarding a preceding period of a predetermined length are held in a so-called queue format.

In FIG. 11B, as examples of the detection information DTC, first motion area coordinates (1, 1) of frame F01, second motion area coordinates (3, 1) of frame F01, first motion area coordinates (1, 0) of frame F02, and first motion area coordinates (0, 1) of frame F04 are illustrated.

In addition, in FIG. 11B, as examples of the detection information DTC, first motion area coordinates (2, 0) of frame F05, first motion area coordinates (1, 0) of frame F06, and second motion area coordinates (0, 1) of frame F06 are illustrated.

Note that when the queue has been filled, the earliest piece of detection information DTC, as a rule, will be discarded as necessary.

FIGS. 12A and 12B illustrate another exemplary situation of the motion detection and another exemplary format of the detection information history according to the present embodiment.

FIG. 12A illustrates another exemplary situation of the motion detection in a series of images.

In FIG. 12A, as in FIG. 11A, images F11 to F16 are each divided into 5×5 areas, and each area where a motion has been detected is hatched, while the other areas are not hatched.

FIG. 12B illustrates another exemplary format of the detection information history in the accumulation section 103.

Unlike the format as illustrated in FIG. 11B, the exemplary format of FIG. 12B holds the detection information for the past in the form of a frequency map representing the frequency of occurrences of motion detection in each area of the image.

Note that the value of the frequency has a predetermined upper limit, and that values of the frequency over the upper limit are regarded as the upper limit value.

For example, in the case where only discrimination is necessary about whether a motion has been detected even only once so far in a given area, the possible values of the frequency are only 0 and 1, and even if a motion is detected again in an area where a motion has been detected before (i.e., an area with a frequency of 1), the value of the frequency for that area remains 1.

In this case, the accumulation section 103 accumulates the detection information for the past in the form of binary information representing whether or not a he reception of the light waves to motion has been detected so far in each area of the image.

In FIG. 12B, the detection information history has a 5×5 map format. Note, however, that the screen may be divided into areas in different manners in other embodiments of the present invention.

FIGS. 13A, 13B, 13C, 13D, 13E, and 13F illustrate how the detection information history in the format as illustrated in FIG. 12B is updated sequentially in the accumulation section 103, based on the detection results for the six images F11 to F16 as illustrated in FIG. 12A. A number on each of the 5×5 areas represents the frequency.

In FIGS. 13A to 13F, it is assumed that the upper limit value of the frequency is 3. Therefore, the value of the frequency remains 3, without being updated, even if motions are detected more than three times in a given area.

In this case, the accumulation section 103 accumulates the detection information for the past in the form of non-binary information representing the number of detections in the past in each area of the image.

The map update according to the above-described embodiment is of a result accumulation type. Note, however, that the map may be updated using an IIR filter or in such a manner that the value for an area erased from the queue is subtracted as appropriate, in other embodiments of the present invention.

The area division section 104 divides the history information into two values based on a threshold previously set, and outputs a result to the alarm management section 105.

Second Embodiment

A second embodiment of the present invention, which will now be described below, and a third embodiment of the present invention, which will be described further below, are applied in the case where the quasi-fixed point photographing is performed, that is, in the case where images are taken from different angles depending on a time period or the like.

FIG. 14 is a block diagram illustrating an exemplary structure of an imaging apparatus (a camera apparatus) 100A to which an image processing apparatus according to the second embodiment of the present invention is applied.

Note that those blocks in the imaging apparatus 100A according to the second embodiment which have counterparts in the imaging apparatus (the image processing apparatus) according to the first embodiment described above are assigned the same reference numerals as the counterparts in the first embodiment, and that detailed descriptions thereof will be omitted.

As illustrated in FIG. 14, the imaging apparatus 100A according to the second embodiment includes an imaging section 101A, the motion detection section 102, an accumulation section 103A, the area division section 104, the alarm management section 105, and an erasing section 106.

The imaging section 101A accepts the light waves formed of the light reflected from the subject and so on, converts the light waves into an image, and outputs the image to the motion detection section 102 in the subsequent stage.

In this respect, the imaging section 101A is almost equivalent to the imaging section 101 in the imaging apparatus 100 according to the first embodiment of the present invention. The imaging section 101A according to the second embodiment is different from the imaging section 101 according to the first embodiment in that the imaging section 101A is provided with a motor for changing a photographing angle and outputs angle information ANGL representing a current photographing angle.

The imaging section 101A outputs the angle information ANGL to the erasing section 106.

The accumulation section 103A receives the detection information DTC from the motion detection section 102, and converts the detection information DTC into a predetermined format to accumulate it therein.

In this respect, the accumulation section 103A is almost equivalent to the accumulation section 103 in the imaging apparatus 100 according to the first embodiment of the present invention. The accumulation section 103A according to the second embodiment is different from the accumulation section 103 according to the first embodiment in that the accumulation section 103A discards the whole or a part of the detection information history DTCH when it has received an erasure signal ERS from an outside.

If the erasing section 106 receives the angle information ANGL from the imaging section 101A and detects a change in the photographing angle, the erasing section 106 outputs the erasure signal (or an initialization command) ERS to the accumulation section 103A.

Figure 15:
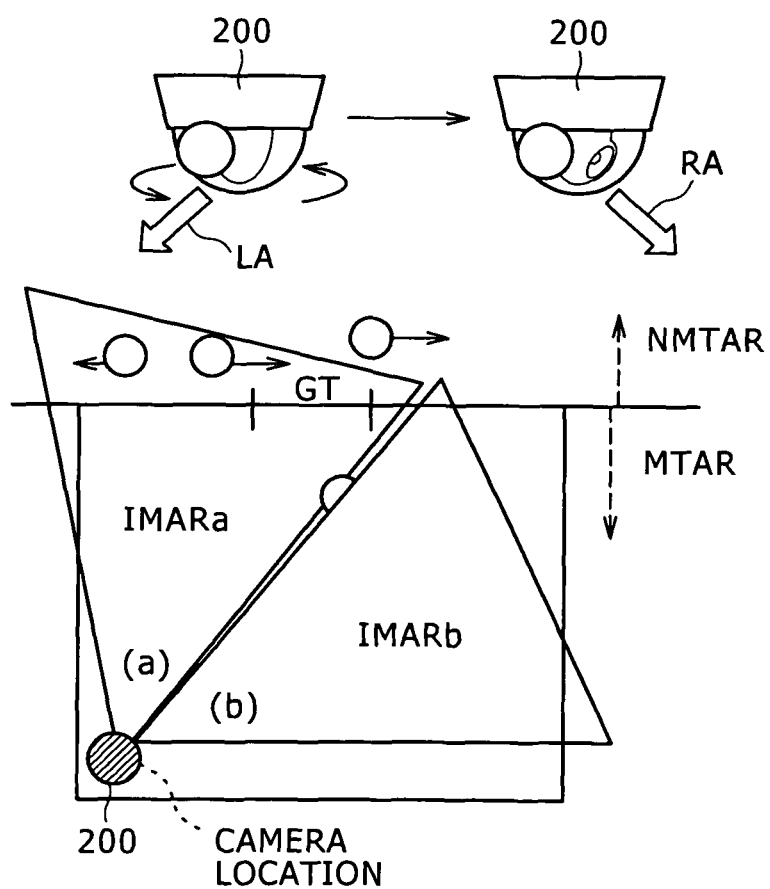
FIG. 15 is a conceptual illustration of a dome-shaped surveillance camera capable of changing a photographing angle using a built-in motor.

FIG. 15 is a conceptual illustration of a dome-shaped surveillance camera 200 capable of changing the photographing angle using a built-in motor.

This dome-shaped surveillance camera 200 is an applicable example of the imaging apparatus according to the second embodiment.

In FIG. 15, "IMARa" and "IMARb" represent photographing areas, "MTAR" represents a monitoring target area, "NMTAR" represents a non-monitoring target area, and "GT" represents an entrance gate.

FIGS. 16A-1, 16A-2, 16B-1, 16B-2, and 16C illustrate exemplary conceptual illustrations of images taken of a scene as illustrated in FIG. 15 and exemplary detection information histories.

FIG. 16A-1 is a conceptual illustration of an exemplary image taken when the photographing angle is set as indicated by a left-facing arrow LA in FIG. 15 (angle A).

Figures 2, 16A:
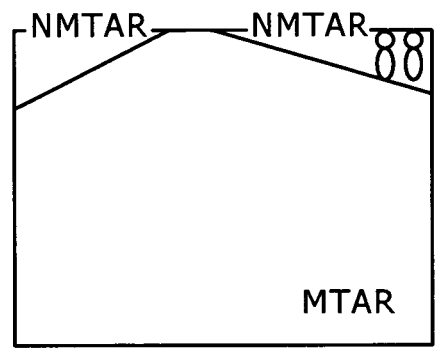

FIG. 16A-2 is a conceptual illustration of an exemplary image taken when the photographing angle is set as indicated by a right-facing arrow RA in FIG. 15 (angle B).

In the case where two (or more) photographing angles are selectively adopted based on the time period or the like during the photographing as illustrated in FIGS. 16A-1 and 16A-2, use of the imaging apparatus according to the first embodiment might cause an inconvenience.

Figures 1, 16B:
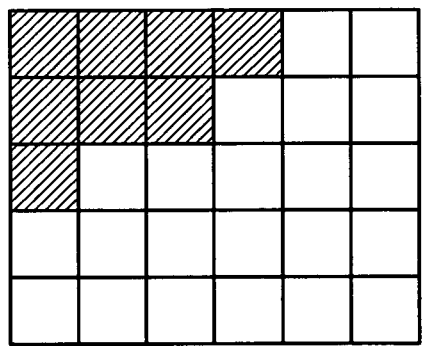
Figures 2, 16B:
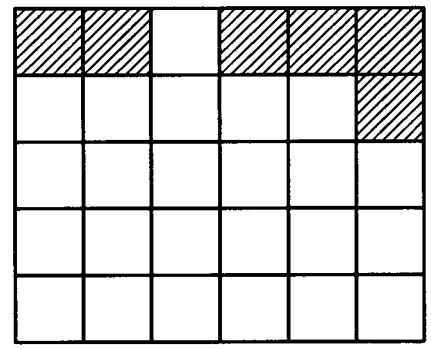

FIGS. 16B-1 and 16B-2 illustrate exemplary detection information histories in the case where the image processing apparatus according to the first embodiment of the present invention is used when photographing is performed for a long time with the photographing angle fixed at angles A and B, respectively.

Areas where motions can occur in the screen differ depending on the photographing angle.

Figure 16C:
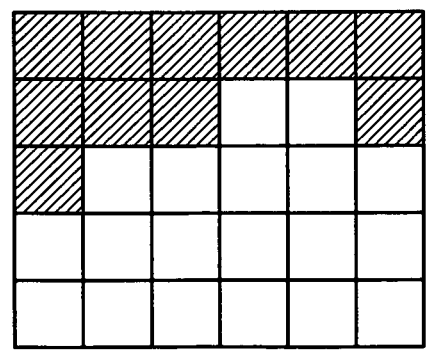

FIG. 16C illustrates an exemplary detection information history in the case where the imaging apparatus 100 according to the first embodiment of the present invention is used to photograph for a long time while the photographing angle is switched between the aforementioned two angles as appropriate.

The detection information history as illustrated in FIG. 16C is equivalent to a combination of the detection information histories as illustrated in FIGS. 16B-1 and 16B-2.

If this detection information history were used, the area discrimination control would be performed on an erroneous assumption that motions have been detected even in areas where motions cannot occur in the case of angle A or areas where motions cannot occur in the case of angle B. This control is not desirable.

With a view to overcome the above problem, the imaging apparatus according to the second embodiment is additionally provided with the erasing section 106, compared to the imaging apparatus according to the first embodiment.

The following description will center on an operation of the erasing section 106.

Figure 17:
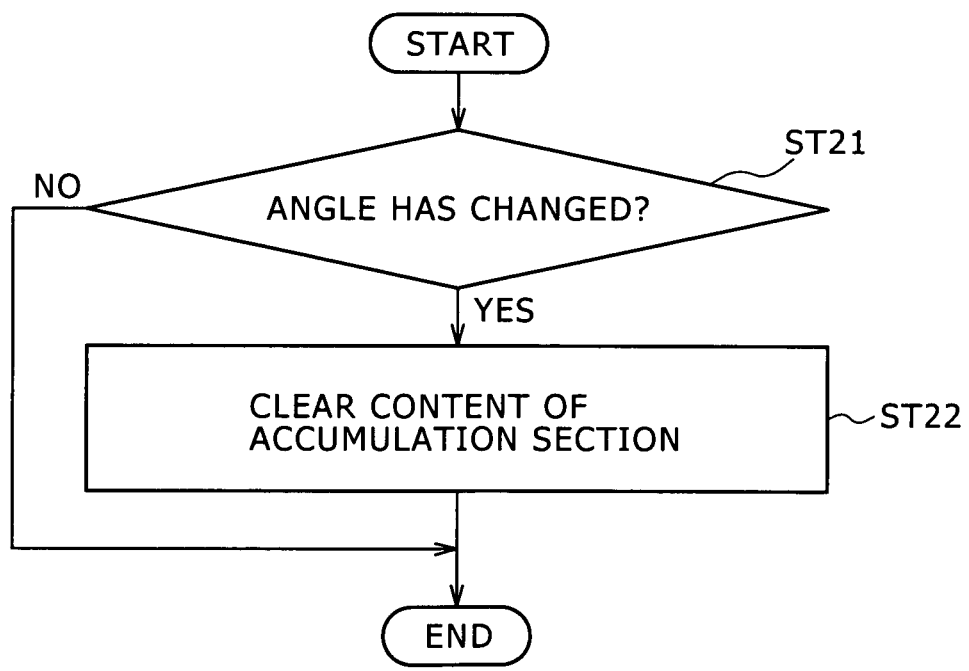
FIG. 17 is a flowchart illustrating an operation flow where an erasing section discards the detection information history in the accumulation section.

FIG. 17 is a flowchart illustrating an operation flow where the erasing section 106 discards the detection information history in the accumulation section 103A.

After start of this procedure, at step ST21, the erasing section 106 refers to the angle information ANGL outputted from the imaging section 101A, and determines whether or not a change has occurred in the photographing angle since the last reference to the angle information ANGL.

If it is determined at step ST21 that no change has occurred in the photographing angle, the erasing section 106 ends this procedure without performing any process.

Meanwhile, if it is determined at step ST21 that a change has occurred in the photographing angle, the erasing section 106 discards the entire detection information history DTCH in the accumulation section 103A at step ST22, and ends the procedure.

Suppose, for example, that the photographing is performed while the photographing angle is fixed at angle A for the twelve hours in the first half of the day and at angle B for the twelve hours in the second half of the day.

Further suppose that the detection information history in the accumulation section 103A is updated as necessary in accordance with the operation flow as illustrated in FIG. 9 while no change occurs in the photographing angle.

In this case, immediately after occurrence of a change in the angle, the erasing section 106 discards the detection information history in the accumulation section 103A.

When a sufficient amount of time has passed since the occurrence of the change in the angle, the detection information history in the accumulation section 103A will gradually approach the detection information history as illustrated in FIG. 16B-1 in the first half of the day and the detection information history as illustrated in FIG. 16B-2 in the second half of the day, but never becomes the detection information history as illustrated in FIG. 16C.

Note that, in the second embodiment also, the format as illustrated in FIG. 12B is adopted as the format of the detection information history, as described above with reference to the first embodiment.

Thus, the problem is avoided that may occur in the case where the imaging apparatus according to the first embodiment of the present invention is applied.

Note that, in the case where the photographing angle of the imaging section 101A is determined based on the time period, the erasing section 106 may be configured to discard the detection information history with particular changes in time, instead of the change in the angle information, as triggers, such as a change from the first half of the day to the second half of the day and a change from the second half of the day to the first half of the day. In this case also, an equivalent effect can be achieved.

Even in the case where the photographing angle is fixed completely, the area where motions can occur may vary depending on the time period. In such a case, the erasing section may be added to the imaging apparatus according to the first embodiment of the present invention, and the detection information history in the accumulation section may be discarded when a predetermined time has arrived.

Note that, in the case where the photographing angle is fixed, the erasing section 106 may not necessarily discard the whole of the detection information history.

If the format as illustrated in FIG. 11B is adopted as the format of the detection information history, for example, the erasing section 106 may discard only the earliest piece(s) of detection information in the detection information history at the time of erasure.

This contributes to avoiding an abrupt change in the contents of the detection information history as a result of the discarding, and thereby preventing a significant change in brightness of the image as a result of the discarding.

Alternatively, it is possible that a later part of the detection information history regarding a time period from a predetermined time T ago till the current time be held in the format as illustrated in FIG. 11B while an earlier part of the detection information history regarding a time period preceding the predetermined time T ago is held in the format as illustrated in FIG. 12B.

In the case where the detection information history is held in this hybrid format, the detection information history being held can cover a long period of time even in a situation where the capacity of the accumulation section 103A is limited, and it is possible to retain the latest pieces of detection information in the detection information history while discarding the earlier pieces of detection information.

Third Embodiment

As with the imaging apparatus 100A according to the second embodiment described above, an imaging apparatus 100B according to the third embodiment assumes the case where multiple photographing angles are selectively adopted based on the time or the like during the photographing.

In order to simplify the description, it is assumed here that the detection information is accumulated while the photographing angle is switched between the two angles as in the second embodiment, i.e., angles A and B.

Figure 18:
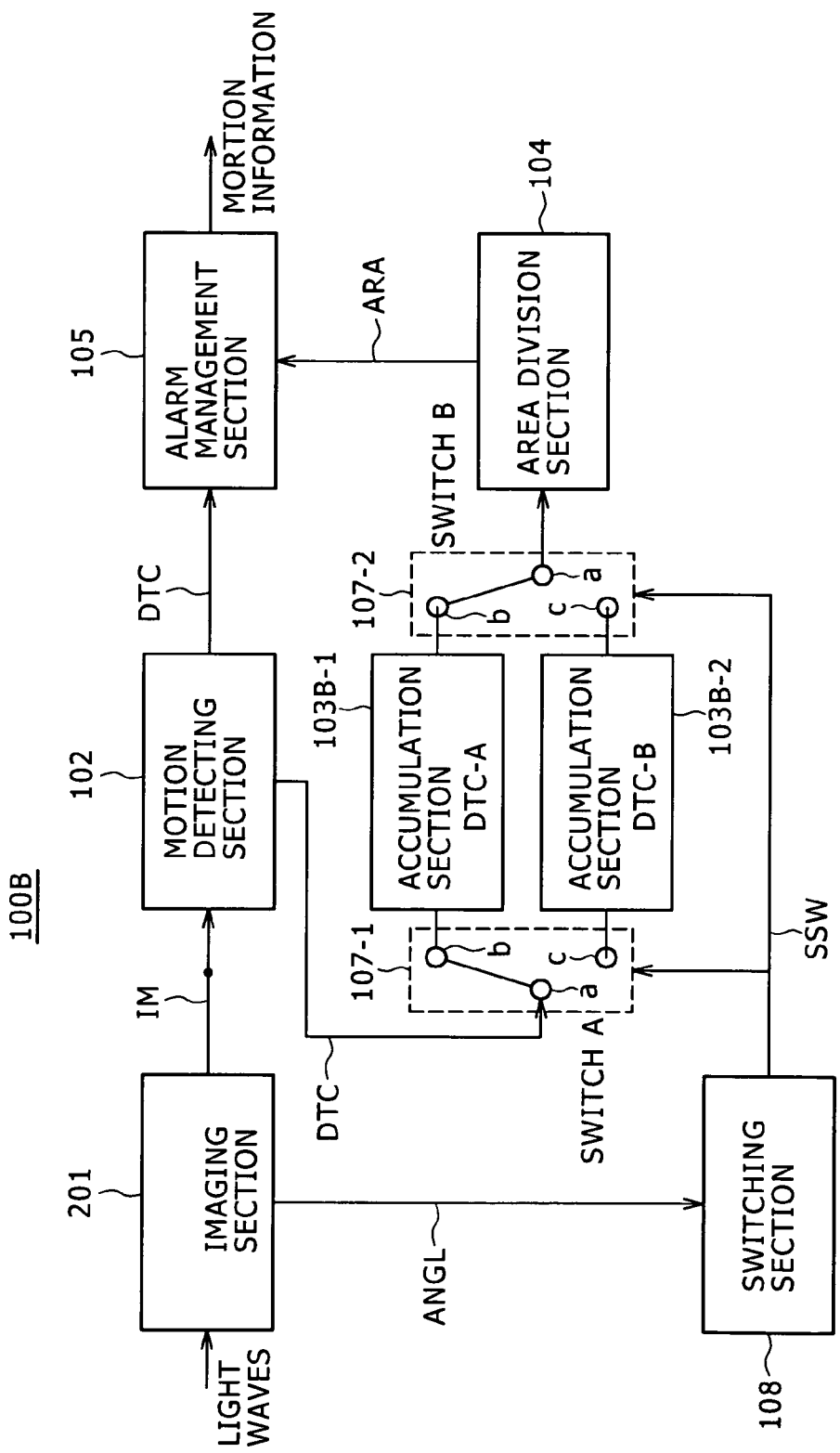
FIG. 18 is a block diagram illustrating an exemplary structure of an imaging apparatus (a camera apparatus) to which an image processing apparatus according to a third embodiment of the present invention is applied.

FIG. 18 is a block diagram illustrating an exemplary structure of the imaging apparatus (camera apparatus) to which an image processing apparatus according to the third embodiment of the present invention is applied.

Note that those blocks in the imaging apparatus 100B according to the third embodiment which have counterparts in the imaging apparatuses (the image processing apparatuses) according to the first and second embodiments described above are assigned the same reference numerals as the counterparts in the first and second embodiments, and that detailed descriptions thereof will be omitted.

As illustrated in FIG. 18, the imaging apparatus 100B according to the third embodiment includes an imaging section 201, the motion detection section 102, accumulation sections 103B-1 and 103B-2, the area division section 104, the alarm management section 105, switches 107-1 and 107-2, and a switching section 108.

The accumulation section 103B-1 accumulates detection information DTC-A corresponding to angle A. The accumulation section 103B-2 accumulates detection information DTC-B corresponding to angle B.

Although the accumulation sections 103B-1 and 103B-2 are assigned different reference symbols in order to facilitate the description, they are blocks equivalent to the accumulation section 103.

Based on a switching signal SSW outputted from the switching section 108, the switch 107-1 selects either the accumulation section 103B-1 or the accumulation section 103B-2 as a location where the detection information DTC outputted from the motion detection section 102 should be accumulated.

The switch 107-1 has terminal a connected to an output line for the detection information DTC from the motion detection section 102, terminal b connected to an input portion of the accumulation section 103B-1, and terminal c connected to an input portion of the accumulation section 103B-2.

The switch 107-1 selectively connects terminal a to either terminal b or terminal c in accordance with the switching signal SSW.

Based on the switching signal SSW outputted from the switching section 108, the switch 107-2 selects either the accumulation section 103B-1 or the accumulation section 103B-2 as a location from which the area division section 104 acquires the detection information history DTCH.

The switch 107-2 has terminal a connected to a portion of the area division section 104 via which the detection information history is inputted thereto, terminal b connected to an output portion of the accumulation section 103B-1, and terminal c connected to an output portion of the accumulation section 103B-2.

The switch 107-2 selectively connects terminal a to either terminal b or terminal c in accordance with the switching signal SSW.

If the switching section 108 receives the angle information ANGL from the imaging section 201 and detects a change in the photographing angle, the switching section 108 outputs a switching signal SSW corresponding to the current photographing angle to the switches 107-1 and 107-2.

Figure 19:
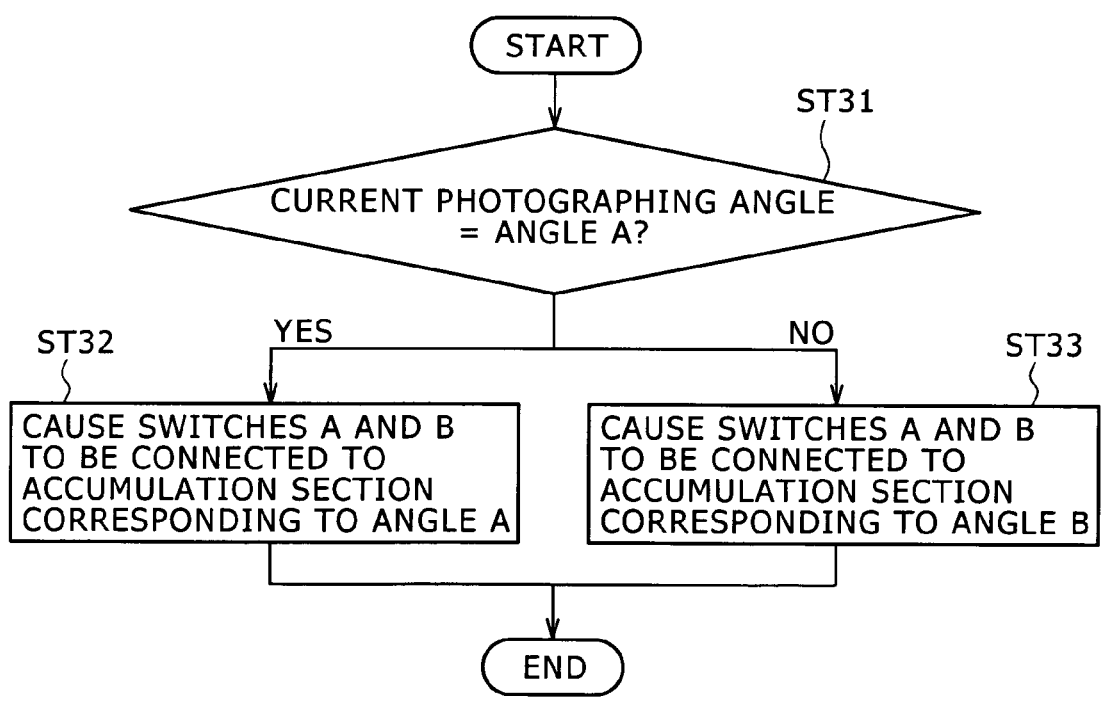
FIG. 19 is a flowchart illustrating an operation flow where a switching section outputs a switching signal to cause a switch in switches as appropriate.

FIG. 19 is a flowchart illustrating an operation flow where the switching section 108 outputs the switching signal to cause a switch in the switches 107-1 and 107-2 as appropriate.

After start of this procedure, at step ST31, the switching section 108 refers to the angle information ANGL outputted from the imaging section 201 to determine whether or not the current photographing angle is angle A.

If it is determined at step ST31 that the current photographing angle is angle A, control proceeds to step ST32. At step ST32, the switching section 108 outputs the switching signal SSW to the switches 107-1 and 107-2 to cause them to be connected to the accumulation section 103B-1 corresponding to angle A. Then, this procedure is ended.

Meanwhile, if it is determined at step ST31 that the current photographing angle is not angle A, i.e., that the current photographing angle is angle B, control proceeds to step ST33. At step ST33, the switching section 108 outputs the switching signal SSW to the switches 107-1 and 107-2 to cause them to be connected to the accumulation section 103B-2 corresponding to angle B. Then, this procedure is ended.

In the second embodiment, the detection information history in the sole accumulation section 103A is once discarded when the angle is switched.

In this case, if a time interval between angle switches is short, the detection information may not sometimes be accumulated so sufficiently as to exhibit sufficient effects.

In contrast, in the third embodiment, the number of accumulation sections provided is the same as the number of angles, and the detection information accumulated is not discarded when the angle is switched. This contributes to solving the aforementioned problem.

In the description of the third embodiment, the number of photographing angles has been limited to two, i.e., angles A and B, for the sake of simplicity. It will be understood, however, that three or more angles can be supported by other embodiments of the present invention where the number of accumulation sections is the same as the number of angles, and the switching section controls the switches to be connected to one of the accumulation sections corresponding to the current angle.

As described above, the preferred embodiments achieve the following effects.

A reduction in the load on the surveillant, a retrenchment in the recording resources, a reduction in a network load, and so on are achieved.

After completion of convergence of the map, the motion detection can be performed only with respect to the area where motion monitoring is desired. Even this can produce a result equivalent to that which will be produced when the motion detection is performed with respect to the entire screen.

This contributes to reducing a computational load required for the detection, i.e., power consumption.

Note that the methods described in detail above can be implemented as a program corresponding to the above-described procedures which is to be executed by a computer such as a CPU (Central Processing Unit).

Also note that such a program may be stored in a storage medium such as a semiconductor memory, a magnetic disk, an optical disc, or a Floppy® disk, and accessed by a computer where that storage medium is loaded to execute the program.

The present application contains subject matter related to that disclosed in Japanese Priority Patent Application JP 2008-169515, filed in the Japan Patent Office on Jun. 27, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
   a processor; and
   a memory, the memory storing program code executable by the processor to perform operations comprising:
   detecting moving objects in a plurality of image data as detection information;
   updating detection information history based on the detection information;
   accumulating the detection information history for each of the plurality of image data as area coordinates for position information of motion in each frame and as binary information for frequency of motion in each frame, the binary information having an upper limit;
   analyzing the detection information history by dividing the plurality of image data into a motion area and a non-motion area based on the detection information;
   outputting final motion information based on a detection result and area information; and
   masking the detection result when motion is detected in the motion area.

2. The image processing apparatus according to claim 1, wherein the operations further comprise retaining final motion information if a target block corresponds to the non-motion area.

3. The image processing apparatus according to claim 1, wherein the operations further comprise erasing portions of the detection information for the detection information history when a specified condition is met.

4. The image processing apparatus according to claim 3, wherein the specified condition includes a passing of a specified period of time since last erasure.

5. The image processing apparatus according to claim 1, wherein
the plurality of image data includes images taken from different photographing angles,
the operations further comprise outputting an erasure signal, when a change in the photographing angle is detected based on angle information, and
upon outputting of the erasure signal, discarding a part of the detection information history.

6. The image processing apparatus according to claim 1, wherein the operations further comprise:
performing a switching process in accordance with angle information, wherein
the plurality of image data includes images taken from different photographing angles,
a number of the different photographing angles corresponds to a separate one of N angles, where N is a natural number, and
accumulating the detection information and input of the detection information history to the area division section appropriately while switching between the N independent accumulation sections in accordance with the angle information.

7. The imaging apparatus according to claim 1, the operations further comprising outputting image data to the detection section after acquiring images based on control from an outside.

8. A non-transitory computer readable medium storing program code, the program code being executable by a processor to perform operations comprising:
detecting moving objects in a plurality of image data as detection information;
updating detection information history based on the detection information;
accumulating the detection information history for each of the plurality of image data as area coordinates for position information of motion in each frame and as binary information for frequency of motion in each frame, the binary information having an upper limit;
analyzing the detection information history by dividing the plurality of image data into a motion area and a non-motion area based on the detection information;
outputting final motion information based on a detection result and area information; and
masking the detection result when motion is detected in the motion area.

9. The non-transitory computer readable medium according to claim 8, further comprising retaining final motion information if a target block corresponds to the non-motion area.

10. The non-transitory computer readable medium according to claim 8, further comprising erasing portions of the detection information for the detection information history when a specified condition is met.

11. The non-transitory computer readable medium according to claim 10, wherein the specified condition includes a passing of a specified period of time since last erasure.

12. The non-transitory computer readable medium according to claim 8, wherein,
the plurality of image data includes images taken from different photographing angles,
generating an erasure signal when a change in the photographing angle is detected based on angle information, and
discarding a part of the detection information history based on the erasure signal.

13. The non-transitory computer readable medium according to claim 8, further comprising:
performing a switching process in accordance with angle information, wherein,
the plurality of image data includes images taken from different photographing angles,
a number of different photographing angles accumulation corresponding to a separate one of N angles, where N is a natural number; and
accumulating of the detection information and updating the detection information history based on the number of different photographing angles.

14. The non-transitory computer readable medium according to claim 8, further comprising generating image data after acquiring images based on control from an outside.

15. A method, comprising:
detecting moving objects in a plurality of image data as detection information;
updating detection information history based on the detection information;
accumulating the detection information history for each of the plurality of image data as area coordinates for position information of motion in each frame and as binary information for frequency of motion in each frame, the binary information having an upper limit;
analyzing the detection information history by dividing the plurality of image data into a motion area and a non-motion area based on the detection information;
outputting final motion information based on a detection result and area information; and
masking the detection result when motion is detected in the motion area.

16. The method according to claim 15, further comprising retaining final motion information if a target block corresponds to the non-motion area.

17. The method according to claim 15, further comprising erasing portions of the detection information for the detection information history when a specified condition is met.

18. The method according to claim 17, wherein the specified condition includes a passing of a specified period of time since last erasure.

19. The method according to claim 15, wherein
the plurality of image data includes images taken from different photographing angles,
generating an erasure signal when a change in the photographing angle is detected based on angle information, and
discarding a part of the detection information history based on the erasure signal.

20. The method according to claim 15, further comprising:
performing a switching process in accordance with angle information, wherein
the plurality of image data includes images taken from different photographing angles, a number of different photographing angles accumulation corresponding to a separate one of N angles, where N is a natural number; and
accumulating of the detection information and updating the detection information history based on the number of different photographing angles.

21. The method according to claim 15, further comprising generating image data after acquiring images based on control from an outside.

\* \* \* \* \*